(12) United States Patent
Smith

(10) Patent No.: US 9,284,000 B1
(45) Date of Patent: Mar. 15, 2016

(54) VEHICLE SPLASH GUARD

(71) Applicant: Jeffrey P. Smith, Prosper, TX (US)

(72) Inventor: Jeffrey P. Smith, Prosper, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 14/517,441

(22) Filed: Oct. 17, 2014

(51) Int. Cl.
*B62D 35/02* (2006.01)
*B62D 25/16* (2006.01)

(52) U.S. Cl.
CPC ............. *B62D 35/02* (2013.01); *B62D 25/168* (2013.01)

(58) Field of Classification Search
CPC .............................. B62D 35/02; B62D 25/168
USPC .................. 280/851, 847, 848, 154
See application file for complete search history.

(56) References Cited

U.S. PATENT DOCUMENTS

| | | | |
|---|---|---|---|
| 1,904,343 A | 4/1933 | Zaiger | |
| 2,714,015 A * | 7/1955 | Sherman | 280/851 |
| 3,088,751 A * | 5/1963 | Barry | B62D 25/188 280/851 |
| 3,089,712 A * | 5/1963 | Kosik, Jr. | 280/851 |
| 3,279,818 A | 10/1966 | Jones | |
| 3,497,238 A * | 2/1970 | Carlton | B62D 25/188 280/851 |
| 3,713,669 A * | 1/1973 | Evans | 280/851 |
| 4,012,053 A | 3/1977 | Bode | |
| 4,334,694 A | 6/1982 | Iwanicki | |
| 4,382,606 A * | 5/1983 | Lightle | B62D 25/168 280/847 |
| 4,398,739 A * | 8/1983 | McKenzie et al. | 280/851 |
| 4,564,204 A * | 1/1986 | Sullivan et al. | 280/851 |
| 4,627,631 A | 12/1986 | Sherman | |
| 4,629,204 A | 12/1986 | Arenhold | |
| 4,709,938 A * | 12/1987 | Ward | B62D 25/18 280/851 |
| 4,796,905 A * | 1/1989 | Sullivan | 280/851 |
| 4,796,906 A * | 1/1989 | Sullivan | 280/851 |
| 4,832,356 A * | 5/1989 | Liberto et al. | 280/851 |
| 4,921,276 A | 5/1990 | Morin | |
| 5,366,247 A | 11/1994 | Fischer | |
| 5,375,882 A | 12/1994 | Koch, III | |
| 5,564,750 A | 10/1996 | Bajorek | |
| 5,833,283 A | 11/1998 | Shaw | |
| 5,924,735 A * | 7/1999 | Meyer, Jr. | 280/851 |
| 6,375,223 B1 * | 4/2002 | Kirckof | 280/851 |
| 6,786,512 B2 | 9/2004 | Morin | |
| 7,625,013 B2 | 12/2009 | Kellick | |
| 7,717,467 B2 * | 5/2010 | Iverson | 280/847 |
| 8,616,571 B2 | 12/2013 | Smith | |
| 8,668,227 B1 * | 3/2014 | Peotter et al. | 280/847 |

FOREIGN PATENT DOCUMENTS

GB         2 049 590 A       12/1980

OTHER PUBLICATIONS

"Mudflap Made for Aerodynamic Efficiency," CCJ [Commercial Carrier Journal] Daily Report, Feb. 26, 2010, <http://www.ccjdigital.com/mudflap-designed-for-aerodynamic-efficiency/> [retrieved Jan. 7, 2011], 2 pages.

* cited by examiner

*Primary Examiner* — Hau Phan
(74) *Attorney, Agent, or Firm* — Christensen O'Connor Johnson Kindness PLLC

(57) ABSTRACT

A splash guard configured to reduce drag forces, and in turn, improve the aerodynamics of an associated vehicle. The splash guard in some examples defines a forward facing airflow contact surface and rearwardly extending side fins.

19 Claims, 6 Drawing Sheets

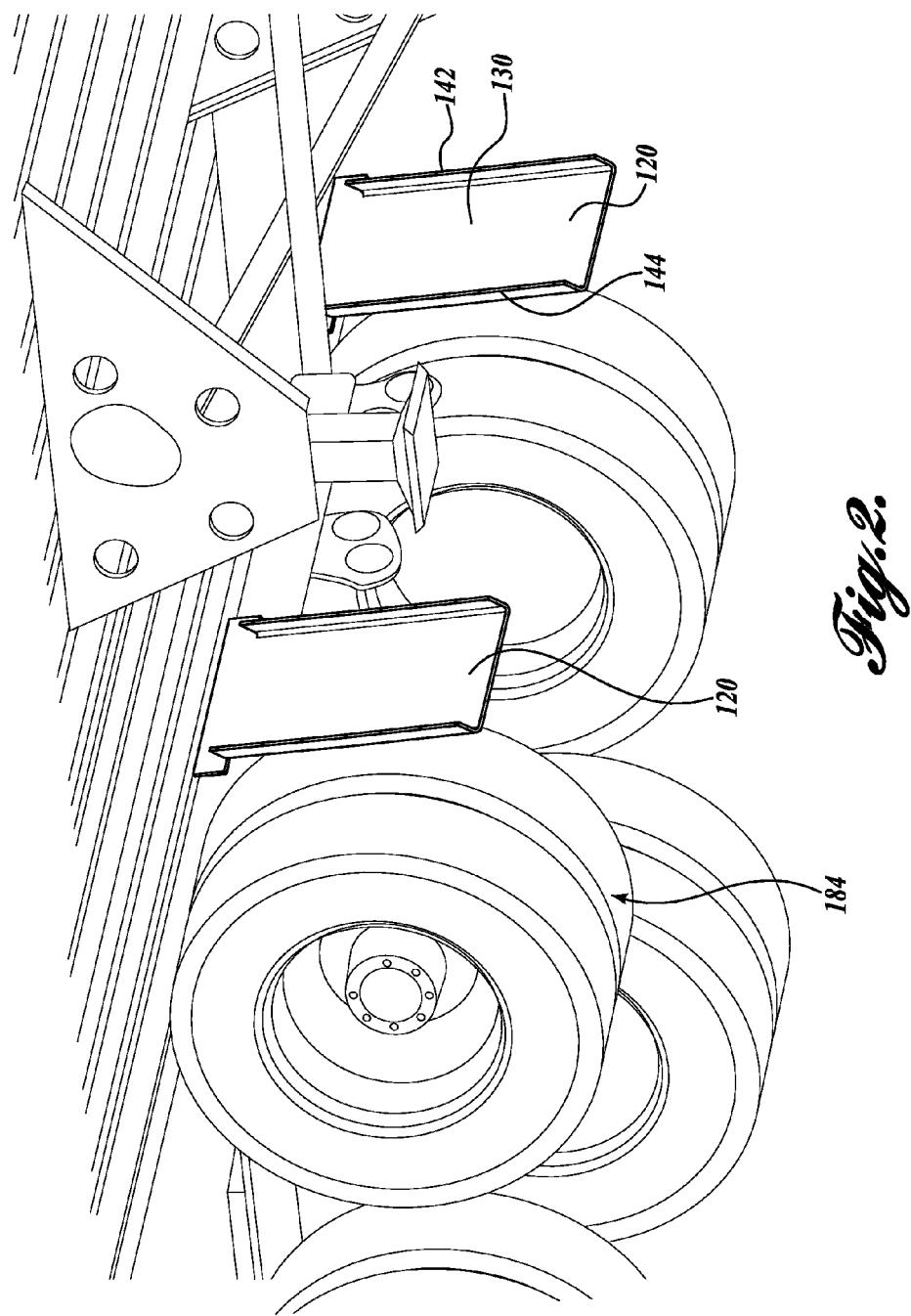

VEHICLE SPLASH GUARD

BACKGROUND

Splash guards or mud guards are often used on vehicles to block debris that may be thrown into the air by the vehicle's rotating tires. In fact, splash guards are mandated on many vehicles, such as Class 8 vehicles. FIG. 5 is a schematic illustration of conventional splash guards 10 mounted on a Class 8 vehicle, such as semi-trailer 12. As best shown in FIG. 6, the splash guard 10 includes a thin planar body 14 defining a forward facing planar surface 16 (see FIG. 6) and a rearward facing surface 18. The perimeter of the forward facing surface 16 is formed by sharp leading edges 20. The splash guard 10 may be secured at its top end to the vehicle 12 in a conventional manner such that the forward facing surface 16 extends vertically at a spaced distance behind the vehicle's tire(s) 22. The planar, forward facing surface 16 is suitably positioned relative to the associated tire(s) to deflect debris, such as gravel, pebbles, mud, water, or the like, that is thrown into the air by the rotating tires 22.

In general, the planar surfaces 16 of the splash guards 10 are perpendicular to the direction of motion of the vehicle 12, thereby restricting air flow and generating drag forces on the vehicle. Turning to FIG. 6, there is shown a partial plan view of the conventional splash guard 10 of FIG. 5 mounted on one side of the vehicle 12 behind tires 22. As depicted, the tires 22 are arranged in a dual configuration, having an outside tire 22a located proximate the exterior of the vehicle 12 and an inside tire 22b located proximate the interior of the vehicle 12. As the tires 22 rotate in a clockwise direction, the vehicle 12 moves in the direction indicated by arrow A. As such, air flows past the exterior of the vehicle 12, including the outside tire 22a, in a substantially opposite direction of vehicle motion, as indicated by arrows B.

Although much of the surface area of the splash guards 10 is shielded by the tires, as can be seen in FIG. 5, some of the air flows against the splash guard 10 and is displaced by the splash guard 10, thereby generating drag forces.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present disclosure, a splash guard for a vehicle is provided. The splash guard includes a body having a forward facing planar surface, a rearwardly facing planar surface, and left and right side edges. The splash guard also includes first and second fins extending rearwardly from the rearwardly facing surface at the left and right side edges. The first and second fins in one embodiment define first and second generally planar outwardly facing surfaces.

In accordance with another aspect of the present disclosure, a splash guard for a vehicle is provided. The splash guard includes a body having a forward facing planar surface, a rearwardly facing planar surface, and left and right sides. The splash guard includes first and second symmetrically configured fins extending rearwardly from the rearwardly facing surface at the left and right sides. The first and second fins define first and second generally planar, outwardly facing side surfaces that are contiguous with the forward facing planar surface. In one embodiment, the transition between the forward facing planar surfaces and the outwardly facing side surfaces is curved.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein:

FIG. 2 illustrates first and second splash guards employed behind the wheel assemblies of a partial depicted vehicle, such as a Class 8 tractor, wherein the tractor is shown coupled to a trailer;

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following discussion proceeds with reference to examples of splash guards suitable for use with vehicles, such as Class 8 trucks and/or trailers. Generally described, representative examples of the splash guard described herein aim to reduce drag forces caused by the splash guard, thereby improving air flow characteristics around the splash guard, and in turn, improving the aerodynamics of the associated vehicle. As such, the splash guard may increase the overall fuel efficiency of a vehicle. In the examples disclosed herein, each splash guard defines a forward facing airflow contact surface and rearwardly extending side fins. In some embodiments, the fins are formed by rolling the sides of an integrally formed sheet of material, such as aluminum or steel, rubber, suitable thermoplastics, etc.

In the following description, numerous specific details are set forth in order to provide a thorough understanding of one or more embodiments of the present disclosure. It will be apparent to one skilled in the art, however, that many embodiments of the present disclosure may be practiced without some or all of the specific details. In some instances, well-known process steps have not been described in detail in order to not unnecessarily obscure various aspects of the present disclosure. Further, it will be appreciated that embodiments of the present disclosure may employ any combination of features described herein.

Although representative embodiments of the present disclosure are described with reference to Class 8 trucks and/or trailers, it will be appreciated that aspects of the present disclosure have wide application, and therefore may be suitable for use with many types of powered vehicles, such as passenger vehicles, buses, RVs, commercial vehicles, light and medium duty vehicles, and the like, as well as non-powered vehicles, such as trailers and the like. Accordingly, the following descriptions and illustrations herein should be considered illustrative in nature, and thus, not limiting the scope of the claimed subject matter.

Figure 1A:
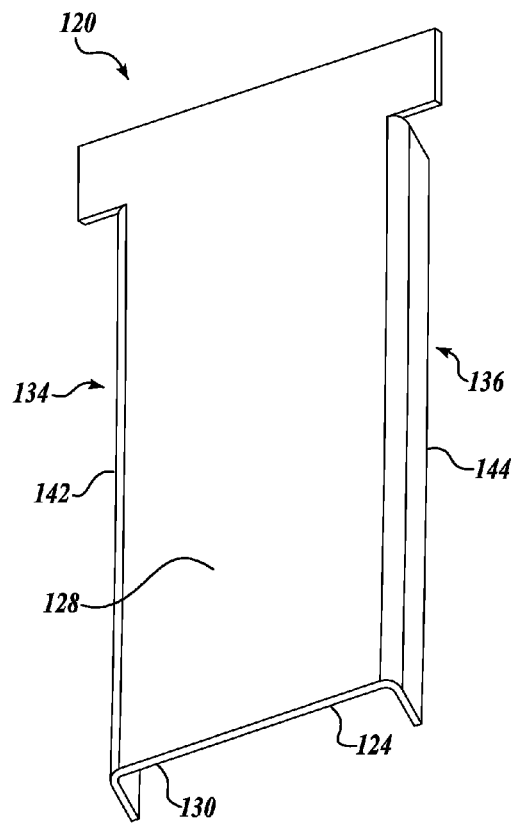
FIG. 1A is a front isometric view of one example of a splash guard in accordance with aspects of the present disclosure.
Figure 1B:
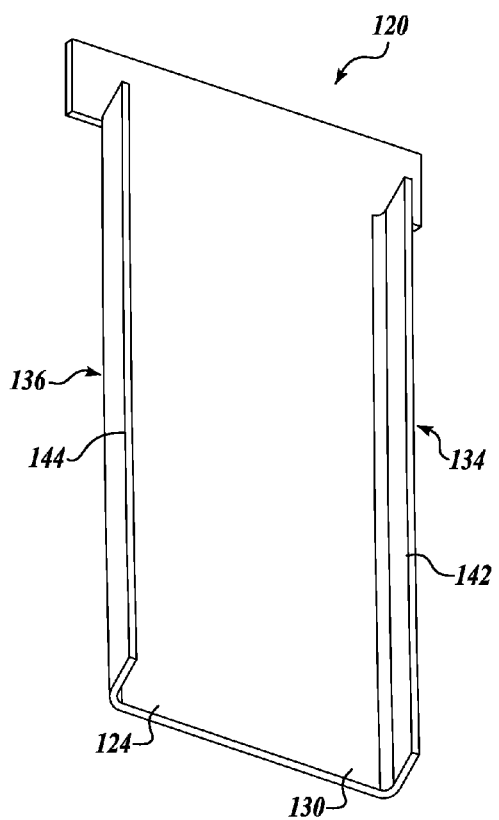
FIG. 1B is a rear isometric view of the splash guard of FIG. 1A.

Turning now to FIGS. 1A and 1B, there is shown one example of a splash guard 120 formed in accordance with aspects of the present disclosure. In the illustrated embodiment, the splash guard 120 includes a body 124 of generally rectangular shape having opposite first and second surfaces 128 and 130 and left and right sides 134 and 136. In some embodiments, the width of the first, or forward facing, surface 128 between left and right sides 134 and 136 of the body 124 is sufficient to extend at least across the tire(s) of an associated wheel assembly, as shown in FIG. 3. In these and other embodiments, the first, or forward facing, surface 128 has a generally planar configuration.

Figure 3A:
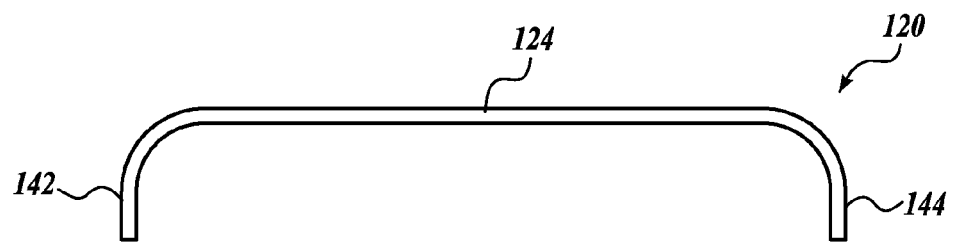
FIGS. 3A and 3B are end views of representative embodiments of a splash guard according to aspects of the present disclosure.

Referring again to FIGS. 1A and 1B, the splash guard 120 includes first and second fins 142 and 144 that extend rearwardly from the left and right sides 134 and 136, respectively, of the body 124. The fins 142 and 144 are generally plate-like, having generally planar outwardly facing surfaces. The fins 142 and 144 can extend continuously or intermittently from the top edge 50 and bottom edge 154 of the body 124, or portions thereof. In the embodiment shown, the fins 142 and 144 extend to a top body section, which is configured to provide a suitable interface for coupling to the associated vehicle. In some embodiments, the first surface 128 transitions to the first and second fins along a general curvature, as shown in FIG. 3A, while in other embodiments, the transition between the first surface and the first and second fins is defined by an edge. In one embodiment, the radius of curvature of the first and second fins is between 2-4 inches. In these and other embodiments, the fins extend rearwardly of the first surface 128 approximately 2-8 inches or more. In some embodiments, the ratio of front surface width to fin depth is in the range of between 5% and 35% or more.

Figure 3B:
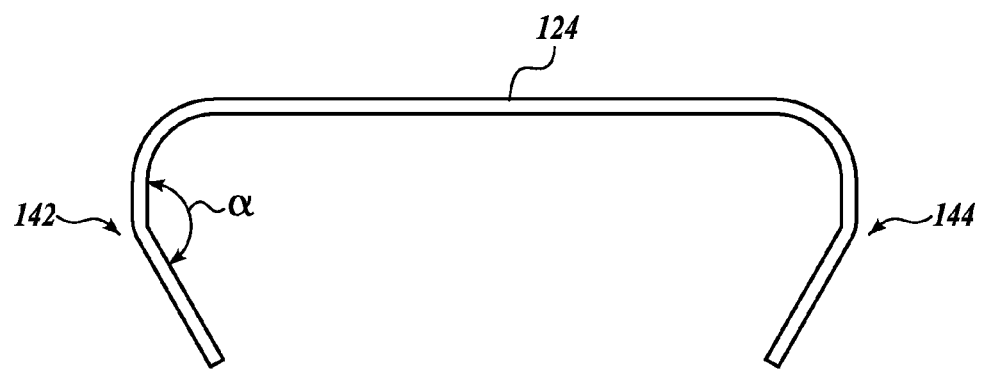
Figure 4:
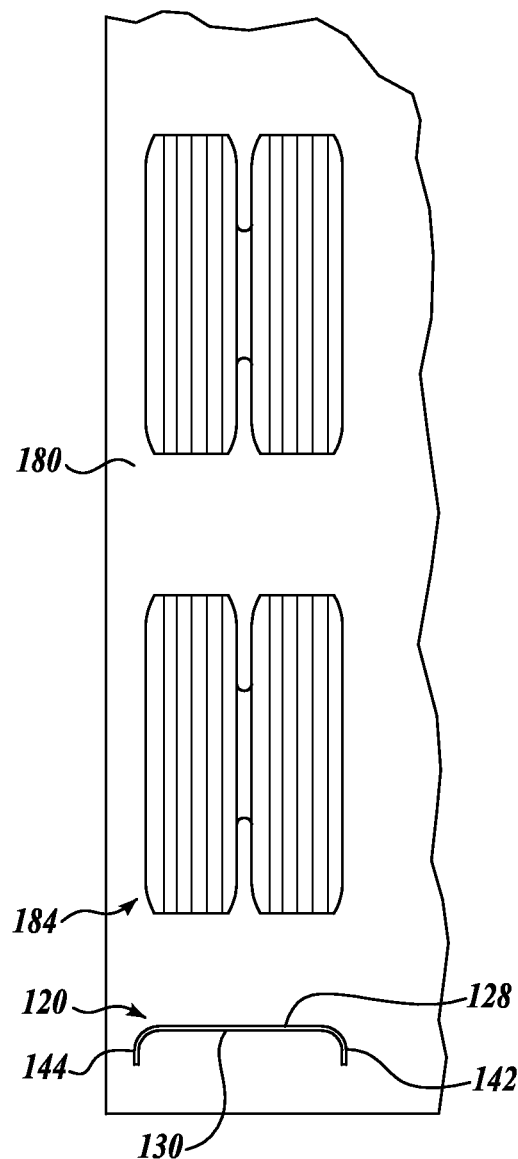
FIG. 4 illustrates in bottom view a partial schematic representation showing the splash guard of FIG. 1 install on a vehicle having a dual wheels and a tandem axle configuration.
Figure 5:
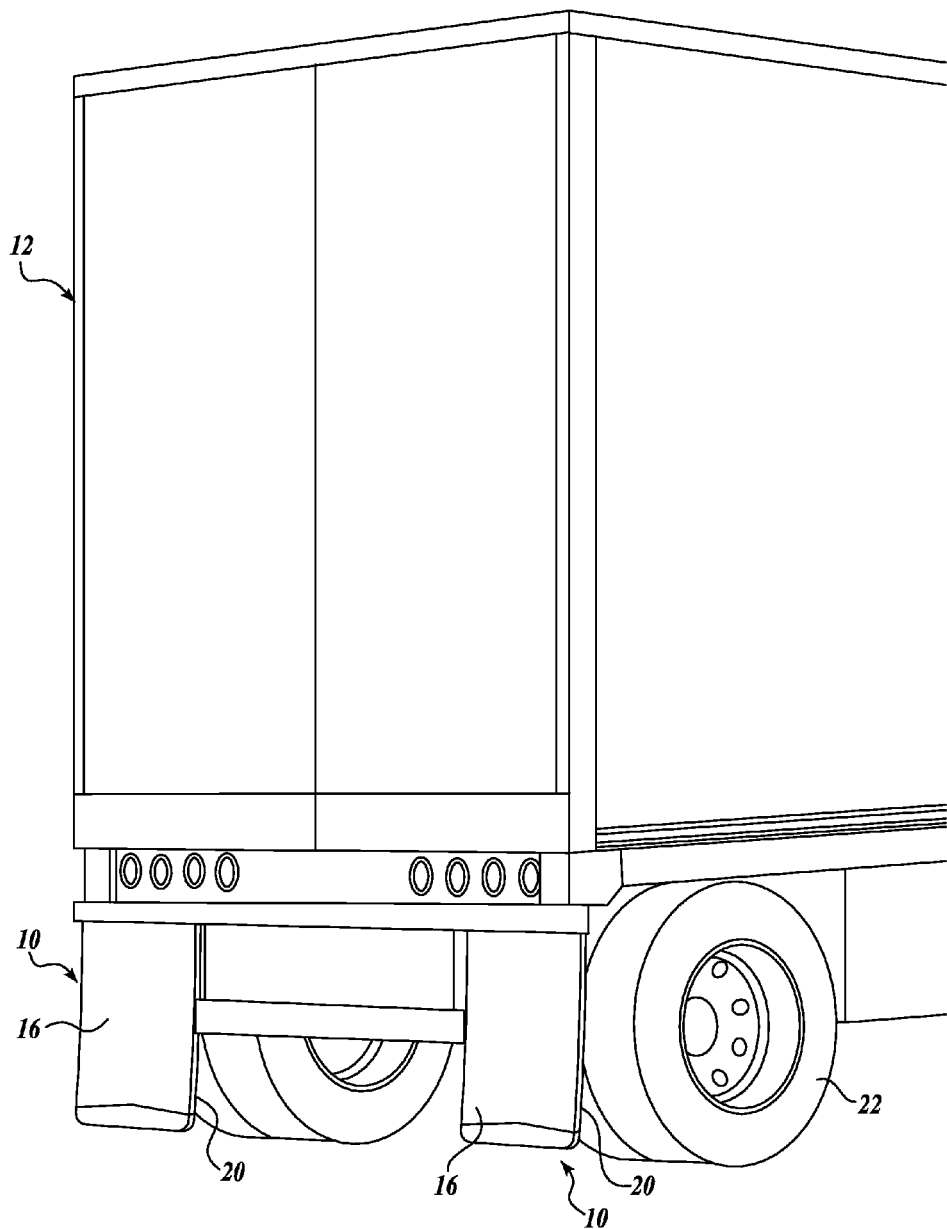
FIG. 5 is a schematic illustration of a vehicle showing a conventional splashguard.

In the illustrated embodiment shown in FIG. 4, the first and second fins 142 and 144 are oriented generally orthogonal to the planar first surface 128, which in some embodiments is generally parallel with the longitudinal axis of the associated vehicle. Other embodiments are contemplated to be within the scope of the present disclosure, as claimed. For example, in some embodiments, the fins 142 and 144 may be tapered slightly inwardly as they extend rearwardly of the body 124. In one embodiment, the taper starts rearwardly of the transition from the planar first surface 128 to the outwardly facing surfaces of the fins 142 and 144, as shown in FIG. 3B. The amount of the taper in these and other embodiments, represented by angle α, can vary (e.g., 5 degrees to 30 degrees or greater) throughout embodiments of the present disclosure.

Additionally, in the embodiments shown, the fins 142 and 144 are generally symmetrical, although asymmetrically configured first and second fins may be practiced with embodiments of the present disclosure. In some embodiments, the first and second fins 142 and 144 have a constant depth (i.e., distance measured from the planar first surface 128 to the free end of the fin) as the fin extends rearwardly from the body 124. In other embodiments, the fins 142 and 144 can have non constant depth, which can vary from top to bottom or portions thereof. In one embodiment, the depth of the bottom section of the fins 142 and 144 is smaller than the depth of the top sections of the fins 142 and 144, or vice versa.

The fins 142 and 144 may be integrally formed with the body 124 or attached thereto by mechanical or chemical fasteners, heat bonding, or the like. In some embodiments, the splash guard 120 can be formed from sheets of fiberglass, plastic, or metal. In other embodiments, the splash guard 120 can be constructed out of a vacuum-formed thermoplastic, an injected molded synthetic, or a natural rubber thermoplastic, such as a Thermoplastic Polyolefin (TPO), etc. Although not shown in the illustrated embodiment, additional fins may also extend across the top and/or bottom of the second surface 130 of the body 124.

Turning now to FIG. 4, a partial view of a vehicle 180 is schematically shown having the splash guard 120 of FIGS. 1A and 1B mounted thereon. As is illustrated, the first surface 128 of the planar body 124 is positioned behind and spaced apart from the vehicle's tires 184. That is, the first surface 128 of the planar body 124 is forwardly facing and the second surface 130 of the planar body 124 is rearwardly facing relative to the front of the vehicle 124. As discussed above, the splash guard 120 may be secured to or otherwise associated with a portion of the vehicle 80, such as the vehicle's frame, fender, trailer, or the like, such that the planar body 124 extends vertically behind the vehicle's tire 184.

Figure 6:
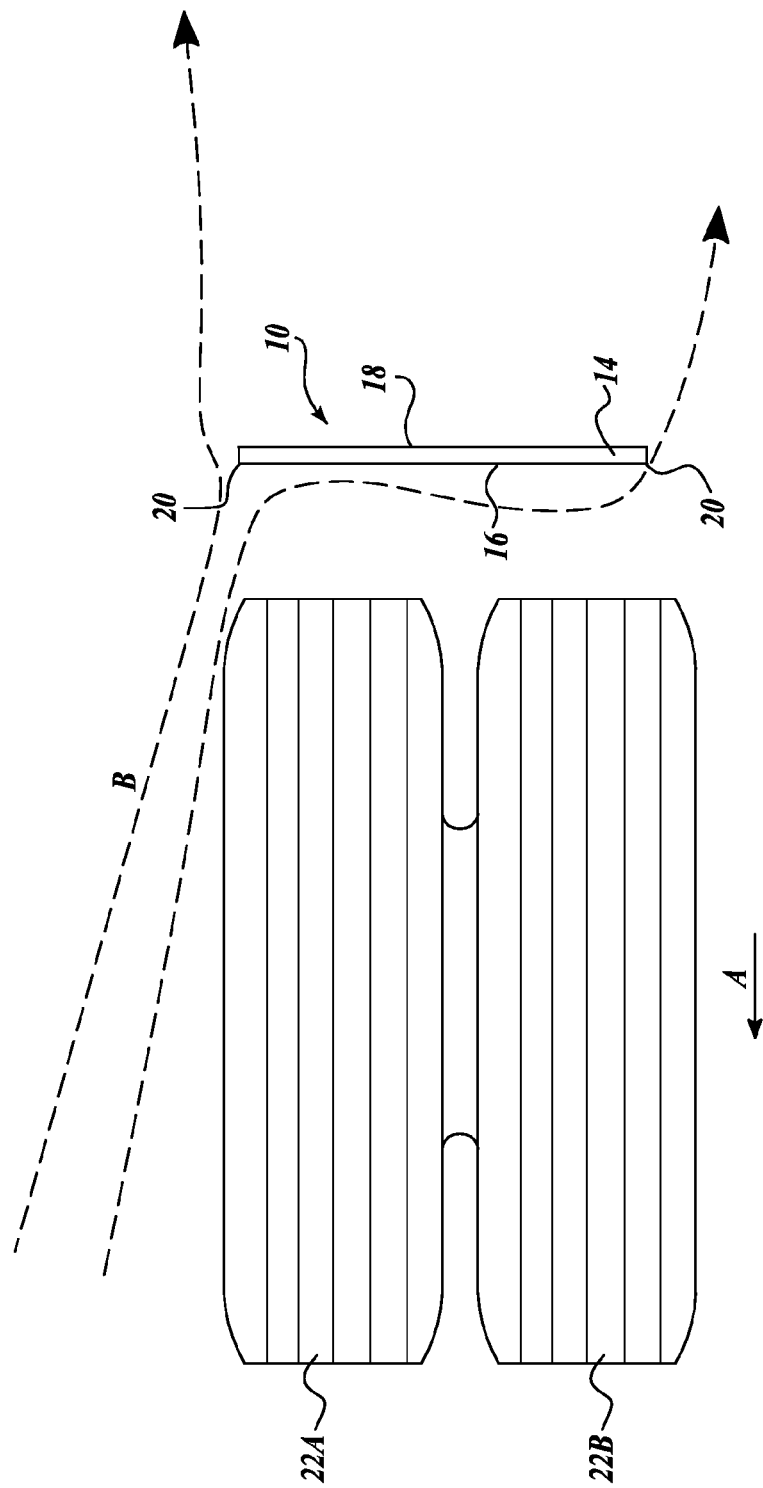
FIG. 6 is a partial plan view of the conventional splash guard of FIG. 4 installed on a vehicle and illustrating air flow around the splash guard when the vehicle is in forward motion.

Once installed, and the vehicle 180 is moving in a forward direction, the splash guards 120 experience air flow in the opposite direction of the forward movement of the vehicle. In some embodiments, as the vehicle moves in a forward direction, the vehicle is subject to cross winds oriented at a yaw angle from the longitudinal axis of the vehicle. In this regard, the configuration of the splash guards 120, including the fins 142 and 144, improve the air flow characteristics around the splash guard 120, thereby reducing drag. In some embodiments, the curved transition from the front surface of the body 124 to the outwardly facing surfaces of the fins 142 and 144 further reduces drag force that typically occurs on the conventional splash guard of FIG. 6.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," "secured," "mounted" and variations thereof herein are used broadly and encompass direct and indirect connections, couplings, securements, and mountings.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A splash guard for a vehicle, comprising:
a body having a forward facing planar surface, a rearwardly facing planar surface, and a generally rectangular shape with left and right side edges and a bottom edge; and
first and second fins extending rearwardly from the rearwardly facing surface at the left and right side edges, the first and second fins defining first and second generally planar outwardly facing surfaces, wherein the first and second fins are formed from a portion of the generally rectangular shape of the body;
wherein the first and second fins extend away from the forward facing planar surface such that, when the splash guard is placed behind at least one tire of the vehicle with the forward facing planar surface facing the at least one tire, the first and second fins extend away from the at least one tire, and
wherein a portion of the bottom edge between the first and second fins does not extend away from the forward and rearwardly facing planes.

2. The splash guard of claim 1, wherein the first and second fins are symmetrically configured.

3. The splash guard of claim 1, wherein the first and second fins are asymmetrically configured.

4. The splash guard of claim 1, wherein the first and second fins extend generally orthogonal to the forward facing planar surface.

5. The splash guard of claim 1, wherein the first or second fin extends rearwardly from the rearwardly facing surface a constant amount.

6. The splash guard of claim 1, wherein the body has a generally planar top body section that extends from a top portion of the left side edge to a top portion of the right side edge.

7. The splash guard of claim 6, wherein the first fin is formed from a bottom portion of the left side edge below the top portion of the left side edge, and wherein the second fin is formed from a bottom portion of the right side edge below the top portion of the right side edge.

8. The splash guard of claim 7, wherein the first fin is formed from a bottom portion of the left side edge below the top portion of the left side edge, and wherein the second fin is formed from a bottom portion of the right side edge below the top portion of the right side edge.

9. The splash guard of claim 1, wherein the first and second fins are integrally formed with the body.

10. The splash guard of claim 9, wherein the integrally formed first and second fins are formed by rolling a portion of the left and right side edges of the body.

11. A splash guard for a vehicle, comprising:
a body having a forward facing planar surface, a rearwardly facing planar surface, and a generally rectangular shape with left and right side edges and a bottom edge; and
first and second symmetrically configured fins extending rearwardly from the rearwardly facing surface at the left and right sides, the first and second fins defining first and second generally planar outwardly facing side surfaces that are contiguous with the forward facing planar surface, wherein the transition between the forward facing planar surfaces and the outwardly facing side surfaces is curved, and wherein the first and second fins are formed from a portion of the generally rectangular shape of the body;
wherein the first and second fins extend away from the forward facing planar surface such that, when the splash guard is placed behind at least one tire of the vehicle with the forward facing planar surface facing the at least one tire, the first and second fins extend away from the at least one tire, and
wherein a portion of the bottom edge between the first and second fins does not extend away from the forward and rearwardly facing planes.

12. The splash guard of claim 11, wherein the radius of curvature of the transition is in the range of between 2-4 inches.

13. The splash guard of claim 11, wherein the first and second fins extend generally orthogonal to the forward facing planar surface.

14. The splash guard of claim 11, wherein the first and second fins extend rearwardly from the rearwardly facing surface a constant amount.

15. A vehicle comprising:
at least one tire; and
a splash guard mounted to the vehicle rearward of the at least one tire, wherein the splash guard comprises:
a body having a forward facing planar surface facing the at least one tire, a rearwardly facing planar surface facing away from the at least one tire, and a generally rectangular shape with left and right side edges and a bottom edge, and
first and second fins extending rearwardly from the rearwardly facing surface at the left and right side edges such that the first and second fins extend away from the at least one tire, the first and second fins defining first and second generally planar outwardly facing surfaces, wherein the first and second fins are formed from a portion of the generally rectangular shape of the body, and wherein a portion of the bottom edge between the first and second fins does not extend away from the forward and rearwardly facing planes.

16. The vehicle of claim 15, wherein the first and second fins are symmetrically configured.

17. The vehicle of claim 15, wherein the first and second fins are asymmetrically configured.

18. The vehicle of claim 15, wherein the first and second fins extend generally orthogonal to the forward facing planar surface.

19. The vehicle of claim 15, wherein the first or second fin extends rearwardly from the rearwardly facing surface a constant amount.

* * * * *